(12) United States Patent
Watts

(10) Patent No.: US 6,344,860 B1
(45) Date of Patent: Feb. 5, 2002

(54) METHODS AND APPARATUS FOR A STEREOSCOPIC GRAPHIC USER INTERFACE

(75) Inventor: Michael P. C. Watts, Portola Valley, CA (US)

(73) Assignee: Seriate Solutions, Inc., Portola Valley, CA (US)

( * ) Notice: Subject to any disclaimer, the term of this patent is extended or adjusted under 35 U.S.C. 154(b) by 0 days.

(21) Appl. No.: 09/200,802

(22) Filed: Nov. 27, 1998

(51) Int. Cl.[7] .................................................. G06F 3/14
(52) U.S. Cl. ....................................... 345/765; 345/856
(58) Field of Search .................................. 345/326, 333, 345/334, 335, 339, 342, 346, 352, 355, 145, 419, 433, 115, 121, 700, 744, 747, 762, 764, 765, 788, 804, 805, 810, 848, 856, 857, 858, 866, 619

(56) References Cited

U.S. PATENT DOCUMENTS

| | | | | |
|---|---|---|---|---|
| 4,808,979 A | * | 2/1989 | DeHoff et al. ............... | 345/856 |
| 4,875,034 A | * | 10/1989 | Brokenshire ................ | 345/848 |
| 4,962,422 A | * | 10/1990 | Ohtomo et al. ............... | 348/51 |
| 5,379,369 A | * | 1/1995 | Komma et al. ............. | 345/419 |
| 6,011,581 A | * | 1/2000 | Swift et al. .................... | 348/58 |
| 6,023,276 A | * | 2/2000 | Kawai et al. ............... | 345/419 |
| 6,064,354 A | * | 5/2000 | DeLuca .......................... | 345/7 |
| 6,225,979 B1 | * | 5/2001 | Taima et al. ................. | 345/157 |

OTHER PUBLICATIONS

Vince, "Virtual Reality Systems", ACM Press Books, SIG-GRAPH Series, Addison–Wesley, p. 55.*
Microsoft VisualBasic Programmer's Guide, "Multiple–Document Interface (MDI) Applications", chapter 14, pp. 365–384.*
Visual Basic 5.0 Programmer's Guide, cover and pp. 365–385, Microsoft Corporation, 1995.
John Vince, Virtual Reality Systems, cover and p. 55, Addison–Wesley, 1995.

* cited by examiner

Primary Examiner—Crescelle N. dela Torre
(74) Attorney, Agent, or Firm—Finnegan, Henderson, Farabow, Garrett & Dunner, L.L.P.

(57) ABSTRACT

A stereo graphic user interface (GUI) includes stereo pairs of conventional GUI interface objects, such as a cursor, menu bars, buttons, and so on. In one implementation, a slave component is located on the same display screen as, and at a fixed displacement from, a master component. Any changes to the master component are tracked and made to the slave component so as to form and maintain stereo pairs of components. The stereo GUI may be configured to support multiple viewers, and a user may employ the stereo GUI not only to view stereo pairs of graphical objects but also to manipulate them.

17 Claims, 7 Drawing Sheets

METHODS AND APPARATUS FOR A STEREOSCOPIC GRAPHIC USER INTERFACE

BACKGROUND OF THE INVENTION

A. Field of the Invention

This invention relates generally to graphic user interfaces for computer systems and, more particularly, to methods and apparatus for providing a stereoscopic graphic user interface.

B. Description of the Related Art

Many modern computer systems employ graphic user interfaces (GUIs) as a way for users to interact with computer application programs. Familiar examples include the Macintosh user interface from Apple Computer, Inc., and the Windows 95 user interface from Microsoft Corp. A GUI may include forms, buttons, tool bars, list boxes, combo boxes, image boxes, and so on. The user navigates between forms and controls by using a pointing device, such as a mouse. Movements of the mouse cause a corresponding movement of a cursor or pointer located on a display screen. When the cursor is positioned over a target feature, the user clicks the mouse button, which triggers a software function that is linked to the target feature. Commonly, the GUI provides the user with visual feedback of his actions; for example, the GUI may cause a button to appear to be depressed.

There exist some stereoscopic ("stereo") viewing implementations that operate in the context of a GUI and that allow a user to view a stereo pair of images on a display screen. One example is the Neon product from Neotech. Such products are essentially conventional monoscopic ("mono") graphic user interfaces that have the capability to display a stereo pair of images. Although such products allow a user to view stereo pairs of images, they do not provide a robust GUI that allows the user to manipulate the stereo pair of images interactively. For example, although such products may employ a stereo pair of cursors, the cursors are used simply as pointing devices. They cannot be used to manipulate or interact with the image, in part because the product does not support stereo pairs of buttons or tool bars. As a consequence, the user must employ cumbersome special key combinations to manipulate the image.

There exists, therefore, a need for a stereo graphic user interface that employs conventional graphic user interface tools.

SUMMARY OF THE INVENTION

Consistent with the invention, a method for providing a stereoscopic graphic user interface comprises displaying on a display screen a master interface object and a slave interface object that is a duplicate of the master interface object and is at a fixed displacement from the master interface object. A master cursor and a slave cursor are displayed on the display screen, and the slave cursor is moved in fixed relation to the master cursor based on movement of a pointing device. The slave interface object is updated to track any changes made to the master interface object.

Consistent with the invention, a method for providing a stereoscopic graphic user interface comprises displaying at least one stereo pair of graphical objects, at least one stereo pair of interface objects, and a list of supported stereo viewers. After receiving a command from a user selecting from the list of supported stereo viewers, the display is updated based on the selected viewer.

Consistent with the invention, a method for using a stereoscopic graphic user interface for color correction comprises displaying at least one stereo pair of color graphical objects on a display screen. After receiving a command from a user to modify the color of the at least one stereo pair of graphical objects, a transfer function is determined. The transfer function is smoothed to create a smoothed transfer function, and the display of the at least one stereo pair of graphical objects is updated based on the smoothed transfer function.

It is to be understood that both the foregoing general description and following detailed description are intended only to exemplify and explain the invention as claimed.

BRIEF DESCRIPTION OF THE DRAWINGS

The accompanying drawings, which are incorporated in and constitute a part of this specification, illustrate embodiments of the invention and, together with the description, serve to explain the advantages and principles of the invention. In the drawings.

DETAILED DESCRIPTION

The invention will now be described in reference to the accompanying drawings. The same reference numbers may be used throughout the drawings and the following description to refer to the same or like parts.

A. Overview

Methods and apparatus consistent with the invention provide a stereo GUI. The stereo GUI includes stereo pairs of conventional GUI interface objects, including a cursor, menu bars, buttons, and so on. As used herein, the term "interface object" refers to any conventional user interface object, including but not limited to a cursor, a button, a tool bar, a menu bar, a text box, a form containing these elements, etc.

One half of the stereo pairs, designated the "master," may be created by using conventional, mono GUI tools. The other half of the stereo pairs, designated the "slave," may be created by methods and apparatus consistent with the invention. In one implementation, the slave component is located on the same display screen as, and at a fixed displacement from, the master component. Any changes to the master component are tracked and made to the slave component so as to form and maintain stereo pairs of components. Furthermore, a user may modify the relative positions of the master and slave versions of a component stereo pair in order to create a sense of depth.

The stereo GUI may be configured to support multiple viewers. For example, the user may use a pull-down menu to select a mono display; or the user may select from a variety of stereo viewers, such as a stereoscope, a switching viewer, an anaglyph viewer, and so on. When used with a stereo viewer, the user may use the stereo GUI, for example, to create a slideshow or to view any graphical object. As used herein, the term "graphical object" refers to items such as an image, a panorama, three dimensional displays that are created using a language such as Virtual Reality Modeling Language (VRML), a display for a stereo digital camera, drawing, text, or a spread sheet.

A user may employ the stereo GUI in conjunction with a stereo viewer not only to view stereo pairs of graphical objects but also to manipulate them. For example, the user may crop, align, translate, rotate, or make color corrections to stereo pairs of graphical objects.

B. Architecture

Figure 1:
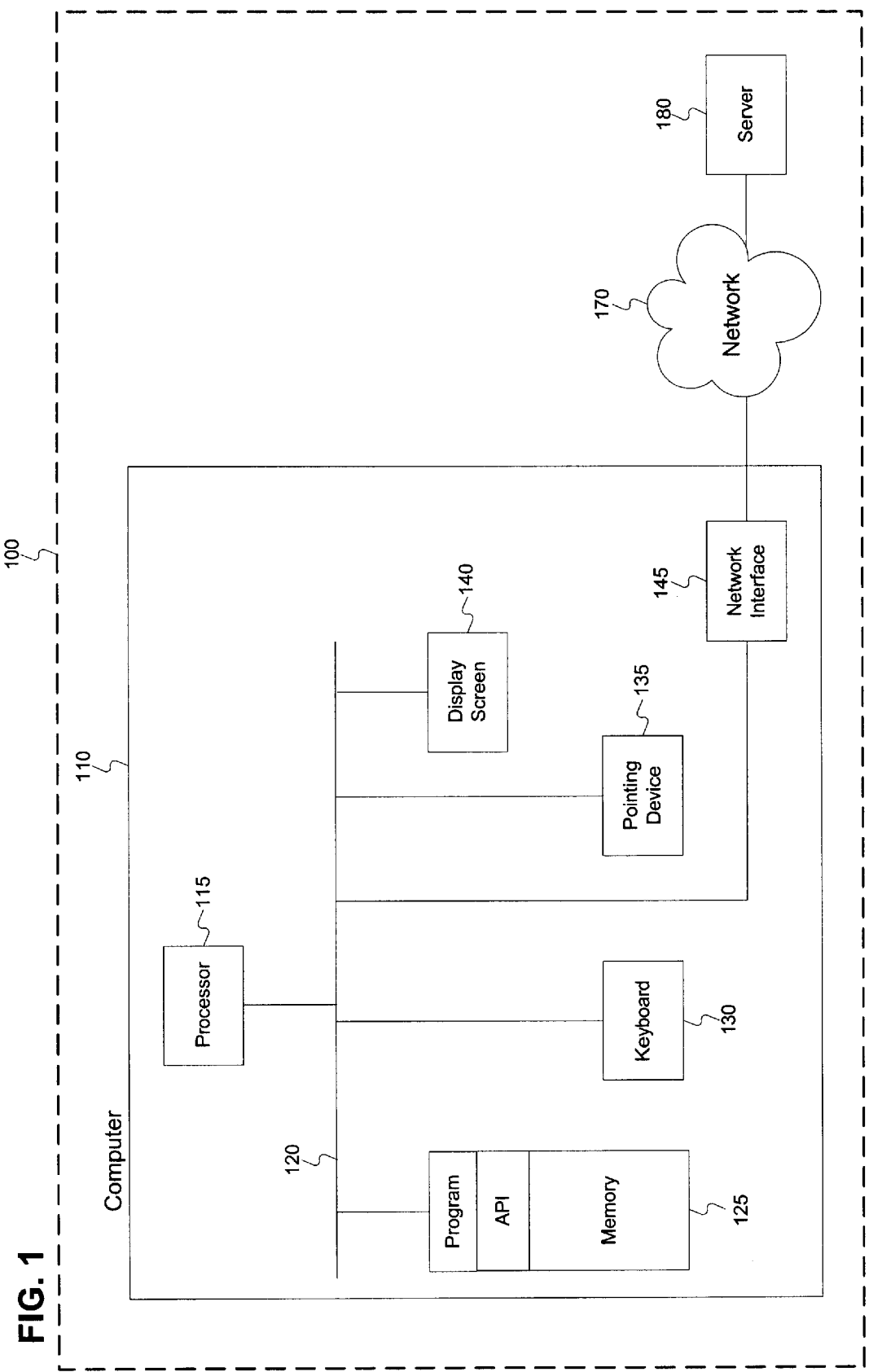
FIG. 1 is a block diagram of a computer system in which methods and apparatus consistent with the invention may be implemented.

FIG. 1 is a block diagram of a computer system 100 in which methods and apparatus consistent with the invention may be implemented. System 100 comprises a computer 110 connected to a server 180 via a network 170. Network 170 may be a local area network (LAN), a wide area network (WAN), or the Internet. System 100 is suitable for use with the Visual Basic™ programming language, although one skilled in the art will recognize that methods and apparatus consistent with the invention may be implemented using other suitable programming languages.

Computer 110 comprises several components that are all interconnected via a system bus 120. Bus 120 may be, for example, a bidirectional system bus that connects the components of computer 110, and contains thirty-two address lines for addressing a memory 125 and a thirty-two bit data bus for transferring data among the components. Alternatively, multiplex data/address lines may be used instead of separate data and address lines. Computer 110 communicates with other computers on network 170 via a network interface 145, examples of which include Ethernet or dial-up telephone connections.

Computer 110 contains a processor 115 connected to a memory 125. Processor 115 may be microprocessor manufactured by Motorola, such as the 680X0 processor or a processor manufactured by Intel, such as the 80X86 or Pentium processors. However, any other suitable microprocessor or micro-, mini-, or mainframe computer, may be used. Memory 125 may comprise a RAM, a ROM, a video memory, or mass storage. The mass storage may include both fixed and removable media (e.g., magnetic, optical, or magnetic optical storage systems or other available mass storage technology). Memory 125 may contain a program and an application programming interface (API) for providing a stereo GUI, consistent with the invention.

A user typically provides information to computer 110 via a keyboard 130 and a pointing device 135 (such as a mouse), although other input devices may be used. In return, information is conveyed to the user via display screen 140.

Figure 2:
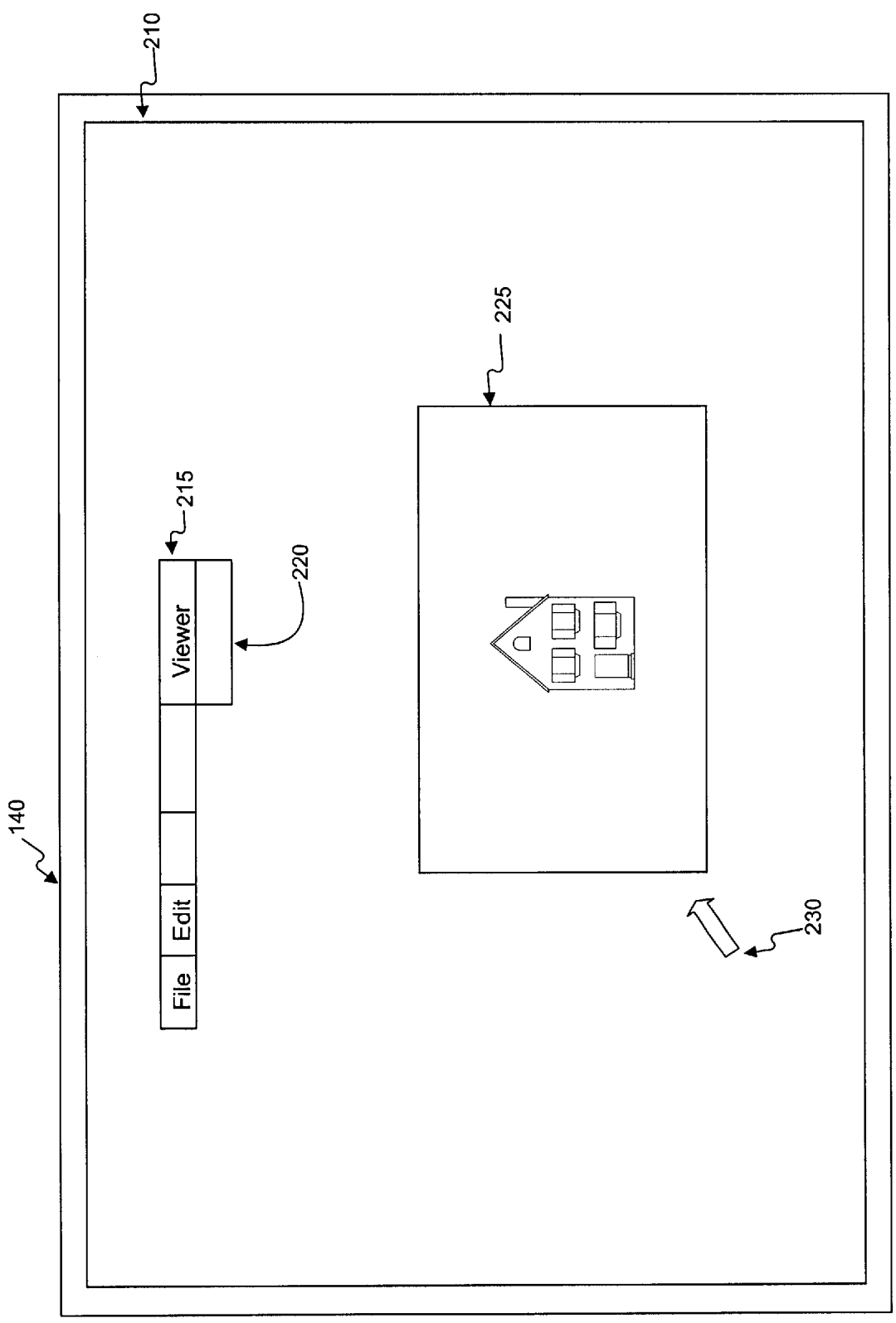
FIG. 2 is a block diagram depicting a conventional mono GUI.

FIG. 2 is a block diagram depicting a conventional mono GUI. The GUI includes display screen 140, a container 210, a menu bar 215, a drop-down list 220, an image 225, and a cursor 230. Conventionally, the basic tool used to display information is a form, which includes other tools such as containers, menu bars, etc. Each form can contain one or more mono graphical objects, and multiple copies of a form may be generated. In Windows 95, these multiple forms are described for example in the Visual Basic 5.0 User's Guide published by Microsoft Corporation.

Menu bar 215 is a form of a tool bar. A tool bar is created from a series of panel controls that act as buttons. When the cursor is placed over a button, a bevel surrounding the button is raised to indicate that the button may be selected by clicking the mouse. When a button is selected, the bevel is inset so that the button appears to be pushed. If the tool bar is a menu bar, selecting a button produces drop-down list 220 of choices, from which the user may select. Each list on drop-down list 220 corresponds to a function that is performed.

Image 225 may be any graphical object that a user wishes to view. In the example shown, image 225 consists of a house surrounded by white space. Cursor 230 is an important element of the GUI because it provides the user with hand-eye coordination feedback. To provide accurate feedback, the cursor must be updated rapidly.

Figure 3:
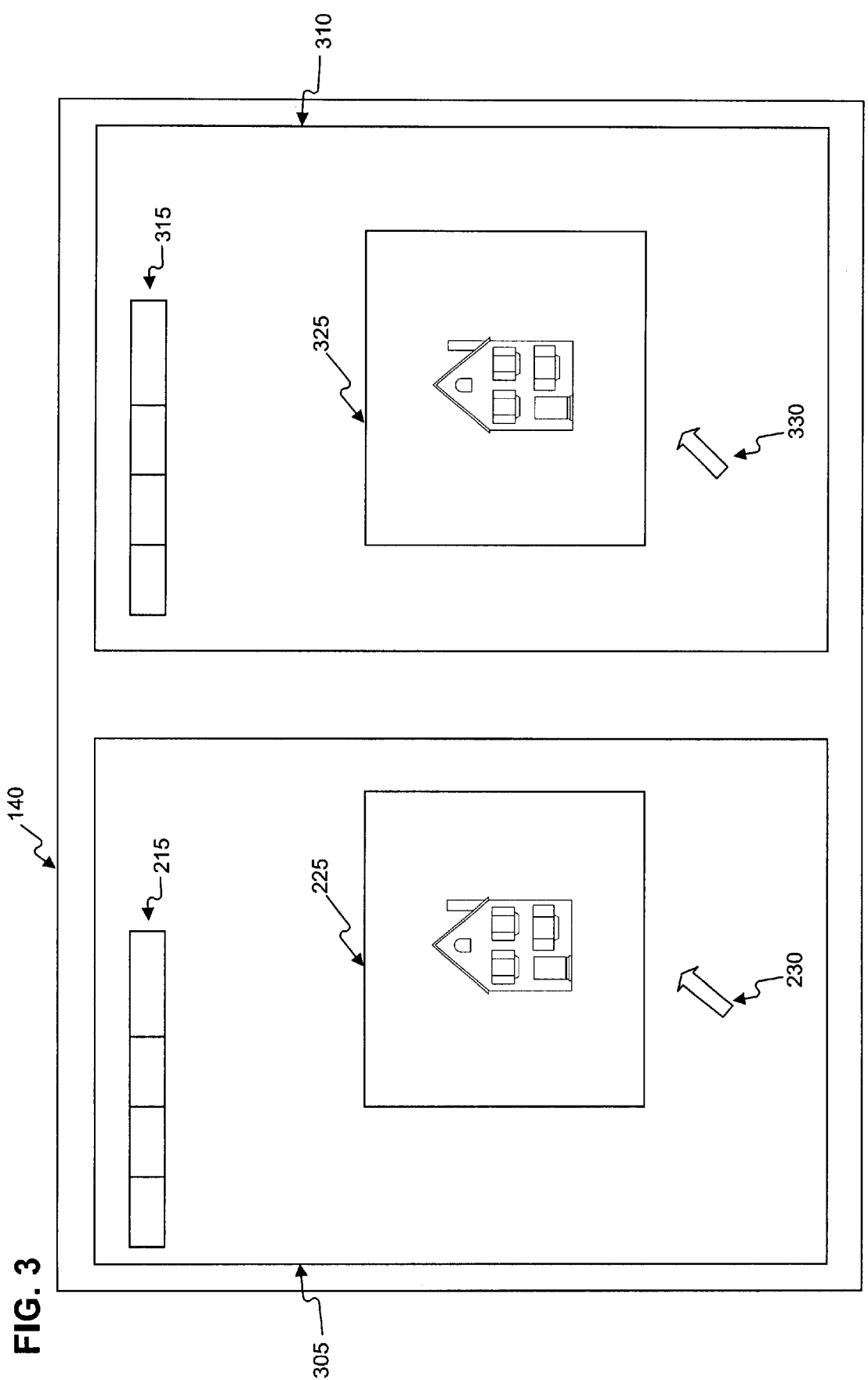
FIG. 3 is a block diagram depicting a stereo GUI for use with a stereoscope viewer, consistent with the invention.

FIG. 3 is a block diagram depicting a stereo GUI for use with a stereoscope viewer, consistent with the invention. A stereoscope viewer is a conventional device that employs mirrors to superimpose stereo pairs of graphical objects so as to produce a graphical object that appears to be three dimensional when viewed through the eyepieces of the viewer. Stereoscope viewers are described, for example, in "Virtual Reality Systems" by John Vince, p.55, Addison-Wesley Publishing Co., 1995.

The stereo GUI depicted in FIG. 3 is shown on a single display screen 140. It includes a "master" container 305 that contains menu bar 215, image 225, and cursor 230. The stereo GUI also includes a "slave" container 310 that contains a menu bar 315, an image 325, and a cursor 330. Images 225 and 325 create a stereo pair of graphical objects, and may be, for example, two stereo photographs or two views of a virtual reality model.

As explained above in reference to FIG. 2, a menu bar and a tool bar are examples of interface objects. Conventional tool bar products, such as Active Bar from Sheridan Software, do not have the flexibility to support the unique requirements of two linked copies appearing in the same form. Consistent with the invention, the tool bar (and menu bar) functionality may be supplied by creating a stereo pair of tool bars (and menu bars) using multiple forms. For example, the tool bar may be assembled by placing multiple panel objects, as supplied by Sheridan Software, on a form. The panels are controlled in software so as to act like buttons. The stereo pair of tool bars are generated by initializing two instances of the form using the LOAD method. The pairs of stereo forms are then inserted in the appropriate containers using the SET_PARENT command in the Windows 95 API. The coordinates of the panels inside the tool bar are now referenced to the perimeter of the container, which is useful for supporting multiple stereo viewers and for controlling the position of the cursors.

In a menu bar, when a button on menu bar 215 is pushed, another pair of forms containing a grid control are made visible and inserted into the appropriate containers using a SET_PARENT function. The grid control contains a list of choices available under the selected button.

In order to maintain a consistent three dimensional image in all interface objects, software is added to the MOUSE_MOVE, MOUSE_ENTER, MOUSE_EXIT, MOUSE_UP, and MOUSE_DOWN events of all master interface objects to change the edges, colors, icons and text of both stereo pairs of interface objects, and to clear the changes from any previously selected interface objects.

Using these same techniques, stereo pairs of forms can be generated that have different combinations of user interface objects for specialized functions, such as file selection, color correction, alignment, drawing, etc.

Cursor 330 is a duplicate of cursor 230, and the two together form a stereo pair that may be viewed using the stereoscope viewer. As explained above in reference to FIG. 2, a cursor is an important element of a GUI and must give the user visual feedback to movements of the pointing device. This is a significant issue for a stereo GUI because the slave cursor (e.g., cursor 330) must be updated rapidly so that the user sees the pair of cursors (e.g., cursors 230 and 330) tracking each other in real time.

Slave cursor 330 may be implemented in numerous ways. In a preferred implementation, code in the MOUSE_MOVE, MOUSE_ENTER, MOUSE_EXIT, MOUSE_UP, and MOUSE_DOWN events responds to user inputs and draws slave cursor 330. If there is no change to the underlying user interface object (or graphical object), the master cursor is simply being moved. In this case, the slave cursor is redrawn by processing the region enclosing the cursor. In particular, the background for the new cursor location is copied into memory, any portion covered by the old cursor is overwritten, the new cursor is added to the new background, the old background is copied back into the display to remove the old cursor, and the new cursor is copied back into the display. The BitBlt function provided in the Windows 95 Application Programming Interface ("API") is used for these copy operations.

If there is a change to the underlying user interface object (or graphical object), the first action taken in the MOUSE events is to copy the old background into the display. The display is then changed in response to the user's input. Finally, the new background is stored, the cursor added, and the new cursor is copied back into the display.

The stereo pair of cursors may also be implemented in alternate ways that are consistent with the invention. For example, slave cursor 330 may be drawn as an icon using the ICON_DRAW function in the Windows 95 API. Alternatively, slave cursor 330 may be implemented by using multitasking to generate a second thread with a second cursor; or the cursors may be implemented by using DirectDraw™, an add-on to Windows 95 that is provided by Microsoft Corporation.

The perceived depth of the cursor in a stereo display is controlled by the horizontal distance between the master and slave cursors (e.g., cursors 230 and 330, respectively). For example, the user may employ the Up and Down arrows on a keyboard to move the stereo cursor towards or away from the user in three dimensional space. In particular, if the KEY_UP event indicates that the user has pressed the Up arrow, the distance between master cursor 230 and slave cursor 330 may be increased, resulting in a user-defined change in perceived depth towards the user. Similarly, if the KEY_DOWN event indicates that the user has pressed the Down arrow, the distance between master cursor 230 and slave cursor 330 may be decreased, resulting in a user-defined change in perceived depth away from the user.

The same principles explained above with respect to the cursor and tool bars may be used to implement other interface objects. For example, stereo pairs of scroll bars may be implemented by using a slider control from Green Tree Software. Similarly, the Rich Text Box controls supplied as part of Visual Basic may be used to provide help boxes and other informational cues, and the Tree lists from Bennet-Tec Information Systems, Incorporated may be used to provide file selection tools.

Figure 4:
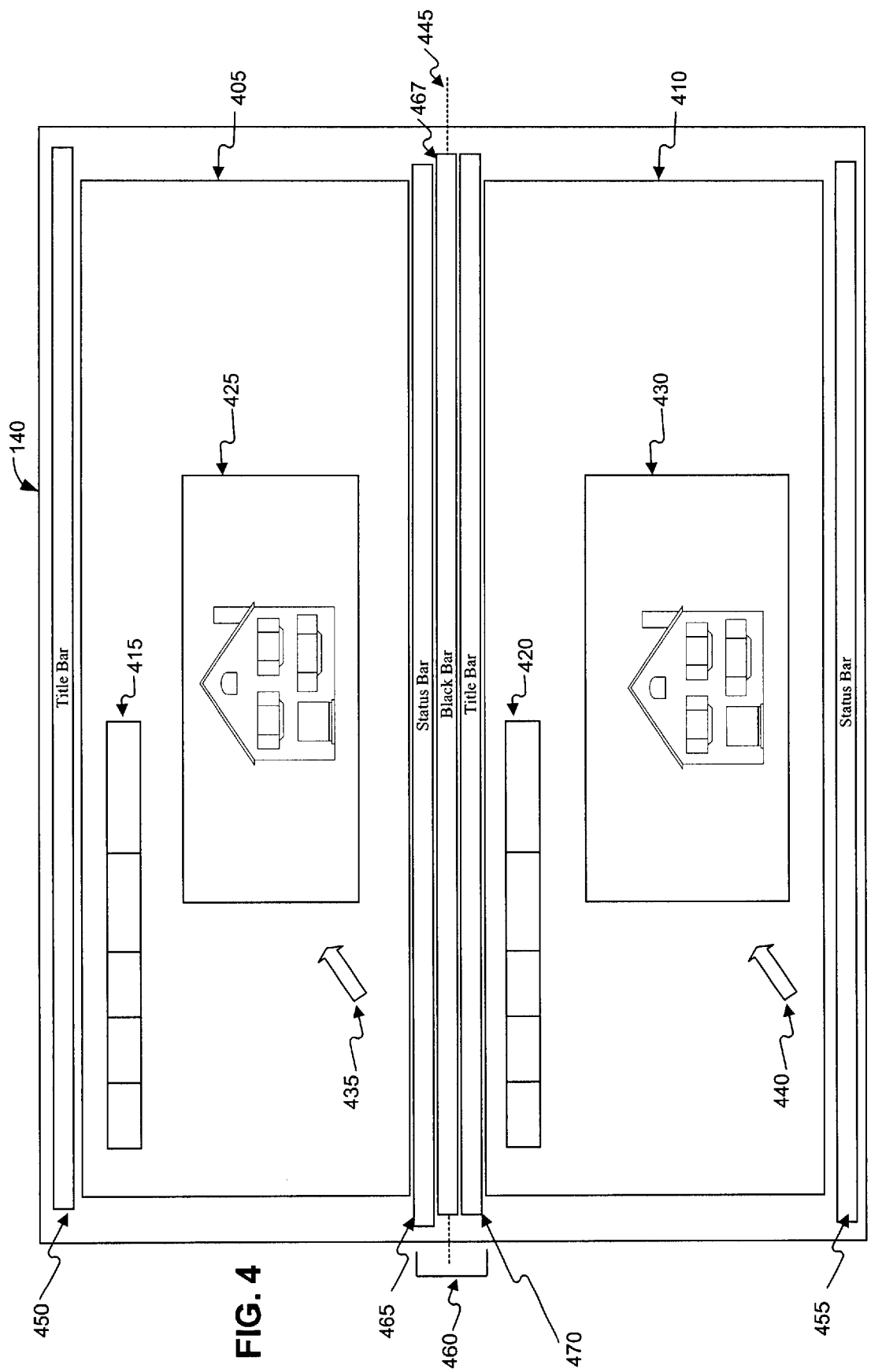
FIG. 4 is a block diagram depicting a stereo GUI for use with a switching viewer, consistent with the invention.

FIG. 4 is a block diagram depicting a stereo GUI for use with a switching viewer, consistent with the invention. The stereo GUI includes containers 405 and 410, each of which form one half of a stereo pair. The shape and position of the containers may be changed to support different viewers (e.g., the stereo viewers shown in FIGS. 3 or 5), but the contents typically remain the same. The use of containers, therefore, simplifies the implementation of a multiple viewer interface.

Container 405 includes a tool bar 415, an image 425, and a cursor 435. Container 410 includes a tool bar 420, an image 430, and a cursor 430, each of which create a stereo pair when combined with their corresponding parts in container 405. The stereo GUI also contains a title bar 450, a status bar 455, a band 460, a duplicate status bar 465, a black bar 467, and a duplicate title bar 470. These bars are useful in supporting the high speed switching viewer described below.

A high speed switching viewer creates a stereo graphical object by taking advantage of the refresh rate of a video display such as display 140. One half of the stereo pair is compressed into the top half of the computer's display buffer (i.e., the portion of FIG. 4 above line 445) and the second half is compressed into the bottom half of the computer's display buffer (i.e., the portion of FIG. 4 below line 445). An external switch interposed between the computer and display 140 triggers a screen refresh halfway through each normal screen update. As a result, each half of the stereo pair is shown at full height, sequentially, on display 140. An example of a switching viewer is the Neon product made by Neotech, or the Crystal Eyes product made by StereoGraphics.

A shuttered eyepiece having independent shutters for the left and right eyes is coupled to, and synchronized with, the external switch. As a result, during one cycle of display 140, a viewer sees one half of the stereo pair through one eye; during the next cycle, the viewer sees the other half of the stereo pair through the other eye. At sufficiently high refresh rates, the viewer perceives the stereo pair of graphical objects as a three dimensional graphical object. In an alternate implementation, a switching polarizer is placed on display 140 and the user views the stereo graphical objects using a pair of passive polarizing glasses.

The use of switching viewers poses special problems, as the vertical height of all interface objects and graphical objects (including icons and fonts) must typically be reduced to half size, as shown in FIG. 4. In a preferred implementation, a special font is used and the vertical dimensions and positions of all features are scaled appropriately. Furthermore, system-provided forms (such as Message boxes or Common dialog boxes) cannot be used because they cannot be customized in layout to provide a half-height pair for the switched viewer. Accordingly, special versions of these forms are assembled as forms and displayed using a SET_PARENT function. When the user has completed interaction with the form (such as by clicking on the OK or Cancel button), the SET_PARENT function is used to send the form back to the original parent form, and the form disappears. While the user is interacting with one of these forms, the other visible forms are disabled.

In addition, the stereo GUI must be modified to accommodate title bar 450 and status bar 455 that typically appear at the top and bottom of an application's window, respectively. This may be achieved by providing band 460 between containers 405 and 410. The top half of band 460 contains the duplicate status bar 465 and the bottom half of band 460 contains the duplicate title bar 470. Band 460 may also contain black bar 467 between the duplicate status bar 465 and the duplicate title bar 470. As a result, the portion of the display above line 445 is identical to that below line 445.

Figure 5:
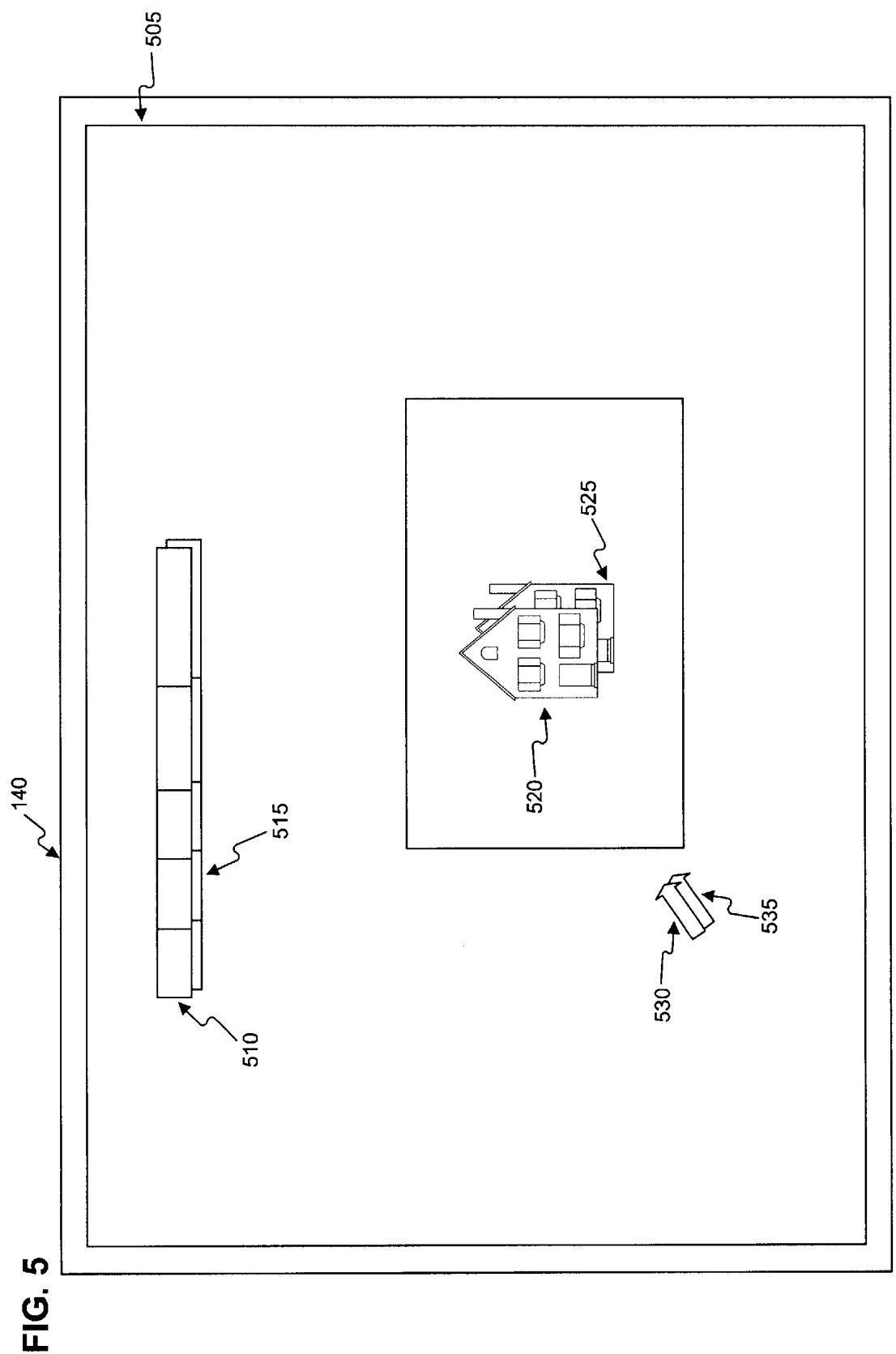
FIG. 5 is a block diagram depicting a stereo GUI for use with an anaglyph viewer, consistent with the invention.

FIG. 5 is a block diagram depicting a stereo GUI for use with an anaglyph viewer, consistent with the invention. In an anaglyph viewer system, each image of the stereo pair is assigned a unique color, and the two images are combined to form a single graphical object. The viewer observes the resulting single graphical object using a pair of colored glasses. Each lens of the glasses has a different one of the two colors assigned to the stereo pair images. In this way, the viewer effectively sees one image of the stereo pair in one eye, and the second image in the other eye. This creates a perception of a three dimensional graphical object.

In the example shown in FIG. 5, container 505 contains a master menu bar 510, a slave menu bar 515, a master image 520, a slave image 525, a master cursor 530, and a slave cursor 535. Each of the master components may be created in a particular color, such as red, and each of the slave components may be created in another color, such as magenta. When viewed through glasses having one red lens and one magenta lens, the master and slave components combine to produce stereo pairs that result in a three dimensional perception.

C. Architectural Operation

Figure 6:
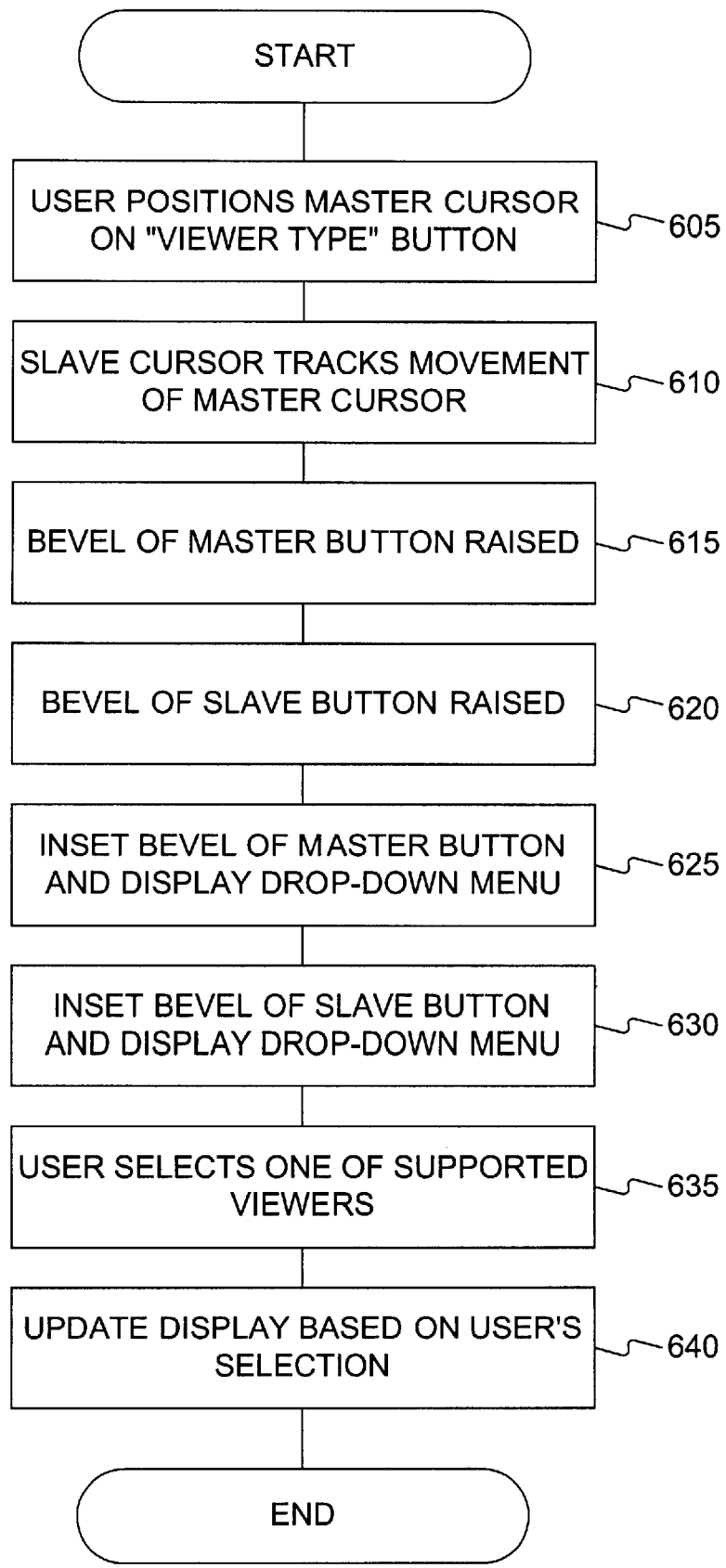
FIG. 6 is a flow diagram depicting changes to a menu bar in response to a user's cursor movement, consistent with the invention.

FIG. 6 is a flow diagram depicting changes to a menu bar in response to a user's cursor movement, consistent with the invention, and is described in reference to the stereoscope viewer system described above in reference to FIG. 3.

The user employs pointing device 135 (such as a mouse) to position master cursor 230 over a button in menu bar 215, such as a button labeled "Viewer Type" (step 605). In response to movement of the mouse, slave cursor 330 is made to track the movement of master cursor 230 (step 610). As a result, when master cursor 230 appears over the master version of the "Viewer Type" button, slave cursor 330 appears over the slave version of the "Viewer Type" button.

When master cursor 230 is positioned over the master "Viewer Type" button, the bevel of the master "Viewer Type" button is raised to indicate that the button may be selected (step 615). Correspondingly, because slave cursor 330 is positioned over the slave "Viewer Type" button, the bevel of the slave "Viewer Type" button is raised to indicate that the button may be selected (step 620).

The user may then click the mouse button, which causes the bevel on the master "Viewer Type" button to be inset and causes master menu bar 215 to display a master drop-down menu that contains a list of available viewers (such as mono, stereoscope, switched, anaglyph, etc.) (step 625). Correspondingly, the bevel on the slave "Viewer Type" button is set to inset and slave menu bar 315 displays a slave drop-down menu that contains the same list of available viewers (step 630).

The user may then use the mouse to move master cursor 230 to one of the choices in the master drop-down menu, such as "switched" (step 635). While this is occurring, any changes that occur in master container 305 (or the interface objects inside it) are duplicated in container 310. In response, the stereo GUI updates the display to display the stereo pair of graphical objects in a manner suitable for the selected viewer (step 640). For example, if the selected viewer is an anaglyph viewer, the stereo pair of graphical objects may be displayed as shown in FIG. 5. Alternatively, if the selected viewer is a shuttered viewer, the stereo pair may be displayed as shown in FIG. 4. When the display is updated based on the user's selection, all graphics shown in the display are updated in addition to the stereo pair of graphical objects; this includes tool bars, menu bars, buttons, the cursor, etc.

Those skilled in the art will recognize that a similar approach may be used with other types of stereo viewers. The techniques described herein may be used to place different interface objects in forms and then produce two instances of the forms linked by code to generate a stereo viewing interface that can be used for any user operation, such as to crop, color correct, translate, rotate, or otherwise manipulate a stereo pair of graphical objects using a stereo GUI.

For example, color correction for a stereo pair of graphical objects is best accomplished while viewing the graphical objects in stereo because the viewer affects the brightness of the graphical object in a flip viewer and the color of the graphical object in an anaglyph viewer. This may be accomplished by receiving a command from a user to modify the color of a stereo pair of graphical objects, while the user is viewing the stereo pair in stereo. Once this command is received, the stereo pair of color correction forms are displayed, the user makes the adjustments, and the display of the stereo pair of graphical objects may be updated so that the user can see the result of the modification in stereo.

Color correction is applied on the basis of different color separations, most commonly the red, green, and blue color planes. In some products, such as in the Dimage V camera packages from Minolta Corporation, the correction is based on factors such as brightness, contrast, or gamma. In other products, such as Photoshop from Adobe Systems Incorporated, the correction is applied in the form of a transfer function in which input values are converted following a response curve. In both cases, each color plane is treated sequentially.

In a preferred implementation consistent with the invention, color correction is applied simultaneously to all three color planes based on factors such as hue, lightness, and saturation. As a result, the final correction is a function of the correction settings, not a function of the order of correction as occurs in conventional systems.

Figure 7:
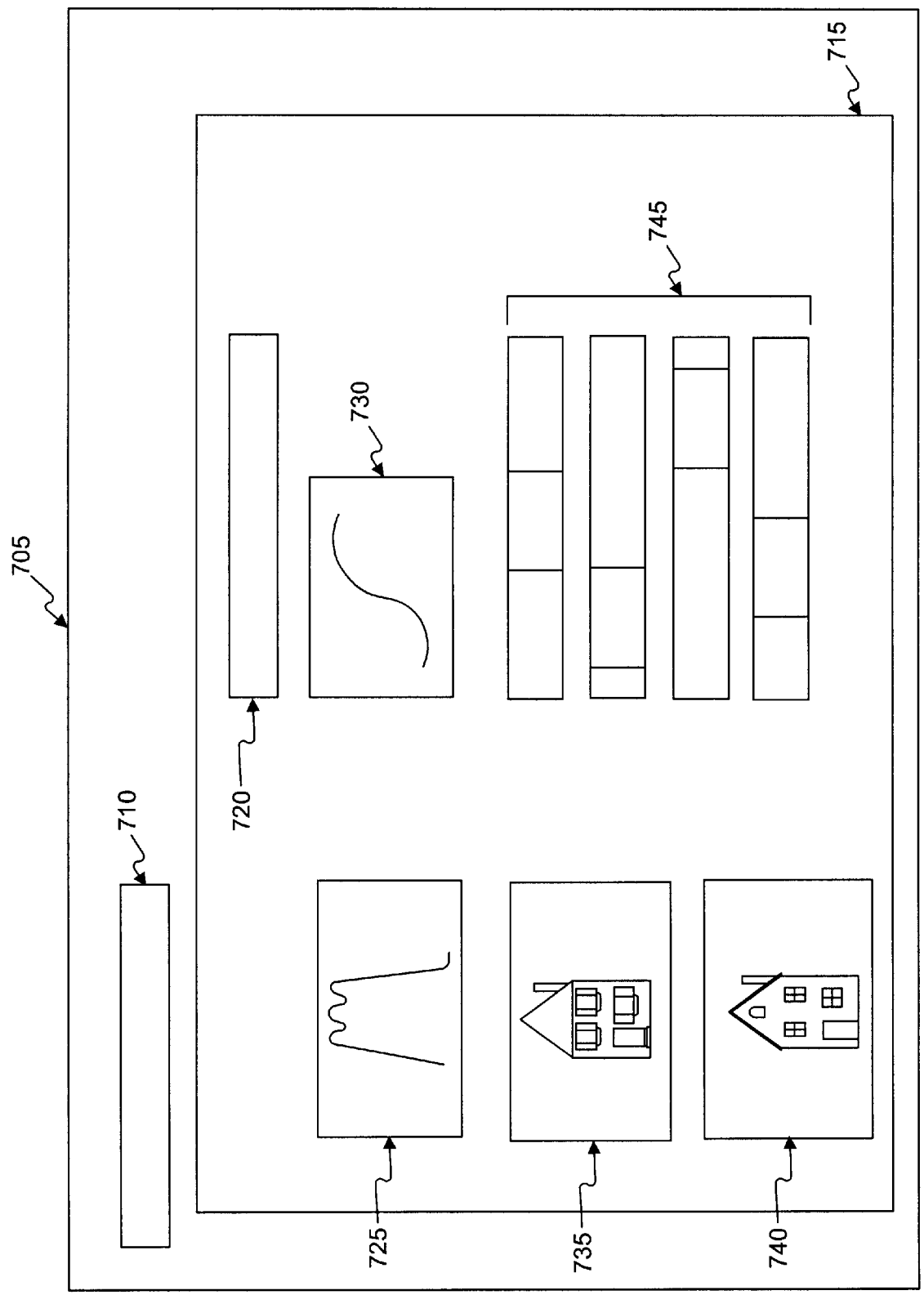
FIG. 7 is sample portion of a stereo GUI for color correction.

A sample portion of a stereo GUI for color correction is shown in FIG. 7. This sample, shown for use with a stereoscope viewer, includes a container 705, which contains a toolbar 710 and a correction form 715. Correction form 715 contains the following items: a color plane selector 720, a histogram 725, a response curve 730, an original image 735, a corrected image 740, and slider controls 745.

The transfer function may be set by adjusting slider controls 745 for brightness, contrast, gamma, and roll-off The transfer function is calculated and displayed as response curve 730. In addition, histogram 725 is shown for the color plane, original image 735, and corrected image 740, so that the user can see the effect of the correction.

The transfer function is calculated from the following:

$$O=((I/255*C+B/255)\char`\^G)*255,$$

where I is an input value, O is an output value, B is brightness, C is contrast, and G is gamma.

The transfer function is smoothed by convolution with a normal distribution, with the roll-off value being the standard deviation in the normal distribution, as follows: O=Integral (O * S), where O is the output and S is a smoothing function. The smoothing function provides a more natural roll-off in the ends of the transfer function, which reduces clipping and loss of visual information.

The transfer function for each color plane is stored as a separate object in a collection of planes. Each time that original image 735 is corrected, the transfer function for each plane is applied to original image 735 and then merged to form corrected image 740. As a result, the color correction is applied simultaneously to all color planes (and not incrementally as in conventional implementations). This is particularly appropriate when applying correction to multiple graphical objects such as a panorama or a stereo pair because the correction in perceived color planes allows a much more intuitive application of color correction.

A similar approach may be used to crop a stereo pair of graphical objects. In particular, user may issue a command selecting a certain portion of the graphical objects for viewing by, for example, using the cursor to draw a box around the portion to be viewed. In response to the user's command, the display of the stereo pair of graphical objects may be updated to show only the selected portion. The selected portion may be displayed at either the same size as the original graphical object, or any other size selected by the user.

D. Conclusion

As described in detail above, methods and apparatus consistent with the invention provide a stereoscopic graphic user interface. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the foregoing description is based on the Visual Basic programming language and the Windows 95™ operating system, but those skilled in the art will recognize that another programming environment may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for providing a stereoscopic graphic user interface, comprising:
   displaying on a display screen a master interface object;
   displaying on the display screen a slave interface object that is a duplicate of the master interface object and is at a fixed displacement from the master interface object;
   displaying a master cursor on one portion of the display screen;
   displaying a slave cursor on another portion of the display screen;
   moving the slave cursor in fixed relation to the master cursor based on movement of a pointing device, wherein moving the slave cursor comprises moving the slave cursor in response to at least one of MOUSE_MOVE, MOUSE_UP, MOUSE_DOWN, MOUSE_ENTER, and MOUSE_EXIT events updating the slave interface object to track any changes made to the master interface object;
   determining if an interface object changes due to movement of the master cursor;
   if the interface object is determined to change due to movement of the master cursor, then copying a new background into memory, erasing the slave cursor, erasing any overlapping parts of the slave cursor from the new background, and displaying a new slave cursor on the new background; and
   if the interface object is not determined to change due to movement of the master cursor, then erasing the slave cursor, applying the change to the interface object, and displaying a new slave cursor.

2. A method for providing a stereoscopic graphic user interface, comprising:
   displaying at least one stereo pair of graphical objects;
   displaying at least one stereo pair of interface objects;
   displaying a list of supported stereo viewers;
   receiving a command from a user selecting from the list of supported stereo viewers; and
   updating the display of the at least one stereo pair of graphical objects based on the selected viewer.

3. The method of claim 2, further comprising forming a pair of containers to contain the at least one stereo pair of graphical objects and the at least one stereo pair of interface objects.

4. The method of claim 3, further comprising transforming the pair of containers based on the selected viewer.

5. The method of claim 4, further comprising transforming the geometry of the at least one stereo pair of graphical objects and the at least one stereo pair of interface objects based on the selected viewer.

6. The method of claim 4, further comprising transforming any displayed text based on the selected viewer.

7. A computer-readable medium containing instructions to perform a method for providing a stereoscopic graphic user interface, the method comprising:
   displaying at least one stereo pair of graphical objects;
   displaying at least one stereo pair of interface objects;
   displaying a list of supported stereo viewers;
   receiving a command from a user selecting from the list of supported stereo viewers; and
   updating the display of the at least one stereo pair of graphical objects based on the selected viewer.

8. The computer-readable medium of claim 7, further containing instructions for forming a pair of containers to contain the at least one stereo pair of graphical objects and the at least one stereo pair of interface objects.

9. The computer-readable medium of claim 8, further containing instructions for transforming the pair of containers based on the selected viewer.

10. The computer-readable medium of claim 9, further containing instructions for transforming the geometry of the at least one stereo pair of graphical objects and the at least one stereo pair of interface objects based on the selected viewer.

11. The computer-readable medium of claim 9, further containing instructions for transforming any displayed text based on the selected viewer.

12. An apparatus for providing a stereoscopic graphic user interface, comprising:
   at least one memory having program instructions, and
   at least one processor configured to use the program instructions for:
      displaying at least one stereo pair of graphical objects;
      displaying at least one stereo pair of interface objects;
      displaying a list of supported stereo viewers;
      receiving a command from a user selecting from the list of supported stereo viewers; and
      updating the display of the at least one stereo pair of graphical objects based on the selected viewer.

13. A system for providing a stereoscopic graphic user interface, comprising:
   means for displaying at least one stereo pair of graphical objects;

means for displaying at least one stereo pair of interface objects;

means for displaying a list of supported stereo viewers;

means for receiving a command from a user selecting from the list of supported stereo viewers; and means for updating the display of the at least one stereo pair of graphical objects based on the selected viewer.

14. The system of claim 13, further comprising means for forming a pair of containers to contain the at least one stereo pair of graphical objects and the at least one stereo pair of interface objects.

15. The system of claim 14, further comprising means for transforming the pair of containers based on the selected viewer.

16. The system of claim 15, further comprising means for transforming the geometry of the at least one stereo pair of graphical objects and the least one stereo pair of interface objects based on the selected viewer.

17. The system of claim 15, further comprising means for transforming any displayed text based on the selected viewer.

* * * * *